United States Patent [19]

Beecher et al.

[11] Patent Number: 4,904,328
[45] Date of Patent: Feb. 27, 1990

[54] BONDING OF FRP PARTS

[75] Inventors: James F. Beecher, Akron; H. William Cocain, Cuyahoga Falls, both of Ohio

[73] Assignee: GenCorp Inc., Fairlawn, Ohio

[21] Appl. No.: 258,521

[22] Filed: Oct. 17, 1988

Related U.S. Application Data

[63] Continuation-in-part of Ser. No. 93,676, Sep. 8, 1987, abandoned.

[51] Int. Cl.$^4$ .......................... B05D 3/06; B32B 31/12
[52] U.S. Cl. ................................. 156/272.2; 156/281; 156/307.3; 156/330; 156/331.7; 427/54.1
[58] Field of Search .................. 156/272.2, 272.6, 281, 156/272.8, 629, 643, 330, 331.7, 307.3; 428/423.7; 427/54.1, 307

[56] References Cited

U.S. PATENT DOCUMENTS 4,307,045  12/1981  Imada et al. ..................... 264/22
4,417,948  11/1983  Mayne-Banton et al. ......... 427/54.1
4,745,018  5/1988   Chihara et al. .................. 156/272.8

FOREIGN PATENT DOCUMENTS 0108189   5/1984  European Pat. Off. .
59-246077  8/1984  Japan ................................. 427/54.1

OTHER PUBLICATIONS

C. E. Bryson et al, Surface Contamination, Genesis, Detection and Control, vol. 1, K. L. Mittal Ed., Plenum (1979).
John R. Vig, "UV/Ozone Cleaning of Surfaces: A Review," ibid.
James Peeling et al, J. Polymer Sci. Poly. Chem. 21, 2047, 1983, Surface Ozonation and Photooxidation of Polyethylene Film.
Kirk-Othmer, "Encyclopedia of Chemical Technology," Third Edition, vol. 16, John Wiley & Sons, New York, 1981, pp. 689-690.

Primary Examiner—Michael Wityshyn

[57] ABSTRACT

Cleaning of thermoset FRP part surfaces to be bonded together is accomplished by the application of low intensity, i.e., 0.05 to 10 watts per cm$^2$, short wavelength ultraviolet radiation in the range of 170 to 300 nm, for a period of time of usually less than 10 seconds which results in removing an effective amount of material, e.g., from about 1 to about 200 angstroms. The cleaning increases the adhesive potential of FRPs to polyurethane adhesives. Furthermore, FRP polymer surfaces treated by this process retain more adhesive strength after aging at elevated temperature in the presence of moisture than untreated surfaces or surfaces washed with isocyanate in MeCl$_2$. Epoxy adhesives, also, can be used.

4 Claims, No Drawings

BONDING OF FRP PARTS

CROSS-REFERENCE

This application is a continuation-in-part application of U.S. Ser. No. 093,676, filed Sept. 8, 1987 for "BONDING OF FRP PARTS", now abandoned.

FIELD OF THE INVENTION

This invention relates to bonding together FRP parts which can be used in the manufacture of automobile, truck and other vehicles and products.

BACKGROUND

Parts manufactured from fiber reinforced plastic (FRP) parts are frequently bonded to other FRP parts or metal parts through the use of polyurethane adhesives. It has been common practice to treat the surfaces to be bonded by sanding and/or by wiping with a primer solution. Typically this primer solution consists of a diisocyanate in methylene chloride (2 percent PAPI). It has been shown by surface spectroscopy that methylene chloride removes a layer of low molecular weight materials, mostly hydrocarbons, from the FRP surface. The diisocyanate can then react with the FRP surface and the polyurethane adhesive.

Without the use of such a treatment, long term adhesion strength is reduced and at times even initial adhesion strength is not adequate. However, methylene chloride and free isocyanates are not desirable materials to use in manufacturing. On the other hand sanding is labor-intensive and can cause environmental (dust) problems.

In the manufacture of semiconductor products, where very clean metal and semiconductor surfaces are required, an UV/Ozone treatment is used for cleaning (C. E. Bryson et al, Surface Contamination, Genesis, Detection and Control, Vol. 1, K. L. Mittal Ed., Plenum 1979).

It is known that while exposure to short wavelength UV light or exposure to ozone alone will have some effect, the simultaneous exposure to UV light and ozone is many times more effective than either factor alone (John R. Vig, "UV/Ozone Cleaning of Surfaces: A Review," ibid).

The surface treatment of high density polyethylene and low density polyethylene with ozone and separately with a UV lamp oxidizes the surface to produce carboxyl groups (James Peeling et al, J. Polymer Sci. Poly. Chem. 21, 2047, 1983). See, also, Kirk-Othmer, "Encyclopedia of Chemical Technology,"Third Edition, Volume 16, John Wiley & Sons, New York, 1981, pages 689–690 regarding UV irradiation of air or oxygen to produce ozone. The wear and static properties of vinyl chloride polymer based gramophone records are improved by treatment of their surfaces with UV at 200 nm in an atmosphere of oxygen at a pressure of at least 15 Torr (U.S. Pat. No. 4,307,045). 1 Tor=1 mm of Hg. nm=nanometer.

Polyethylene terephthalate films can be photoetched with UV radiation having wavelengths less than 220 nm (U.S. Pat. No. 4,417,948).

Polyimides can be photoetched using lasers or low pressure Hg lamps (UV radiation) (European Patent Application Publ. No. 0 108 189 A2).

An aspect of this invention is to avoid the difficulties alluded to above and to provide a new method for adhering together FRP parts.

An aspect is to provide a novel FRP laminate.

These and other aspects and advantages of the present invention will become more apparent to those skilled in the art from the following detailed description and working examples.

SUMMARY OF THE INVENTION

It has been found that the use of low intensity ultraviolet light of wavelengths of from about 170 to about 300 nm or less for 10 sec. or less in air or an oxygen containing gas results in a cleaned surface of the part. This short wavelength radiation forms ozone which oxidizes organic molecules at or in the surface of the FRP part. Carbon dioxide, carbon monoxide and volatile organic species are formed from the low molecular weight material which is loosely bound at the surface. This UV-/Ozone treatment results in a cleaned surface generally free of hydrocarbons and low molecular weight materials which surface with the use of an epoxide or urethane adhesive will provide an improved adhesive bond between FRP parts. This technique, also, eliminates the need to use a wipe of isocyanate in methylene chloride or to sand the surfaces.

DETAILED DESCRIPTION OF THE INVENTION

The glass fiber reinforced thermoset plastic (FRP) such as the polyester resin (preferred) or vinyl ester resin, styrene and glass fiber composition can be a sheet molding compound (SMC) or a bulk molding compound (BMC), or other thermosetting FRP material as well as a high strength molding compound (HMC) or a thick molding compound. The FRP substrate can have from about 10 to 75 percent by weight of glass fibers. The SMC compound usually contains from about 25 to 30 percent by weight of glass fibers while the HMC compound may contain from about 55 to 60 percent by weight of glass fibers. The glass fiber reinforced thermoset plastic (FRP) substrate can be rigid or semirigid (may contain a flexibilizing moiety such as an adipate group in the polyester) and a low profile additive. The substrate, also, may contain other flexibilizing polymers, elastomers and plastomers, such as the styrene-butadiene block copolymers. Unsaturated polyester glass fiber thermosets are known as shown by "Modern Plastics Encyclopedia,"1975-1976, October 1975, Vol. 52, No. 10A, McGraw-Hill, Inc., New York, pages 61, 62 and 105 to 107; "Modern Plastics Encyclopedia,"1979-1980, October 1979, Volume 56, Number 10A, pages 55, 56, 58, 147 and 148 and "Modern Plastics Encyclopedia,"1980-81, October 1980, Volume 57, Number 10A, pages 59, 60, and 151 to 153, McGraw-Hill, Inc., New York, N.Y. For more information on unsaturated polyester resins, vinyl ester resins and monomers for crosslinking these resins see U.S. Pat. No. 4,331,735.

The epoxy resin adhesive used can be the diglycidyl ether of bisphenol A (and its homologs), glycidyl ethers of glycerol, glycidyl ethers of bisphenol F, glycidyl ethers of long-chain bisphenols, epoxylated novalacs, the diglycidyl ester of linoleic dimer acid and so forth. They are cured with aliphatic amines, aromatic amines, anhydrides and polyamides. The epoxides are well known. For more information on epoxy resins please see Lee and Neville, "Epoxy Resins", McGraw-Hill Book Company, Inc., New York, 1957; Lee and Neville, "Handbook of Epoxy Resins,"McGraw-Hill Book Company, New York, 1967; Bruins, "Epoxy Resin Technology,"Interscience Publishers, a division of John Wiley & Sons, New York, 1968 and "Encyclopedia of Polymer Science and Technology,"John Wiley & Sons, Inc., New York, Vol. 1, 1964.

Polyurethane (urethane, isocyanate) based adhesives used in this invention are well known. They are prepared from diisocyanates or triisocyanates, diisocyanate or triisocyanate terminated polyethers or polyesters (polyether urethanes or polyester urethanes). Examples of isocyanates which can be used are 2,4/2,6-tolylene diisocyanate, triphenyl methane-p,p',p''-triisocyanate, the adduct of 2,4-toluene diisocyanate (3 moles) and 3-methylol pentylene glycol-2,4 (1 mole), diphenylmethane-p,p'-diisocyanate, dianisidine diisocyanate and polymethylene polyphenyl isocyanate (preferred) and the like.

Hydroxyl bearing polyethers and polyesters, e.g., polyols, are used for reaction with the isocyanates. Examples of polyether polyols which can be used include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene glycols, the polypropylene-ethylene glycols, and the polybutylene ether glycols. Other copolymers are the ethylene oxide, propylene oxide and butylene oxide adducts of 2-ethylhexanediol-1,3, glycerol, 1,2,6-hexanetriol, trimethylol propane, trimethylolethane, pentaerythritol, triethanolamine, triisopropanolamine, ethylenediamine and ethanolamine.

Polyester polyols which can be used are obtained reacting (1) a major molar amount of a glycol such as ethylene-, propylene-, diethylene-, dipropylene- or butylene glycol; and (2) an acid or anhydride such as adipic acid, azelaic acid, terephthalic acid, or phthalic anhydride and so forth. Examples of some polyesters are poly(ethylene succinate), poly(ethylene adipate), poly(diethylene adipate), poly(ethylene azelate) and poly(ethylene sebacate).

Crosslinking materials having from 2 to 8 hydroxyl groups can be included in the urethane formulation to increase crosslink density and so forth. Examples of such crosslinking agents are glycol, diethylene glycol, propylene glycol, butane diol-1,4, dipropylene glycol, glycerol, trimethylolpropane, butane triols, hexanetriols, trimethylolphenol, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of polyfunctional compounds having three or more reactive hydrogen atoms, such as, for example the reaction product of trimethylolpropane, glycerol, 1,2,6-hexanetriol, sorbitol and other polyols with ethylene oxide, propylene oxide, or other alkylene oxides or mixtures thereof. The urethane adhesive formulation uses gelation catalysts like stannous octoate, dibutyl tin dilaurate, and the like, for the urethane forming reaction.

For information on isocyanate based adhesives see Skeist, "Handbook of Adhesives,"Reinhold Publishing Corporation, New York, 1962. See, also, Saunders et al, "Polyurethanes Chemistry and Technology,"Part I, Chemistry, Interscience Publishers, a division of John Wiley & Sons, New York, 1962.

Fillers can be added to the adhesives.

The processes and products of the present invention can be used in the manufacture of automobile parts such as grille and headlamp assemblies, deck hoods, fenders, door panels and roofs as well as in the manufacture of appliances and electrical components, furniture, machine covers and guards, bathroom components, structural panels and so forth. In particular, the process of the present invention is useful in joining a structural FRP to another structural FRP to reinforce it or to provide a mounting member for a part, for example, the non-visible parts of a car.

In the practice of the present invention, low intensity ultraviolet radiation of short wavelength in air or an oxygen containing gas is applied to the surface of the thermoset FRP parts. Wavelengths of from about 170 to about 300 nm are effective, wavelengths of from about 180 to about 260 nm are preferred. Wavelengths of ultraviolet radiation less than 180 nm are impractical and wavelengths of ultraviolet radiation of greater than 300 nm are ineffective. Low intensity ultraviolet radiation is from about 0.05 to 10 watts/cm$^2$ and preferably from about 0.1 to about 4 watts/cm$^2$.

It is thought that low intensity short wavelength radiation cleans the surfaces of the FRP part by forming ozone which oxidizes the low molecular weight and foreign materials on the surface and oxidizes the substrate surface. The foreign materials may be hydrocarbons found in the air. The oxidized substrate surface is thought to contain polar structures of hydroxy and carboxylic acid groups, carbonyl groups and hydroperoxides. Generally from about 1 to about 200 angstroms, and preferably from about 1 to about 50 angstroms of the substrate surface is removed. The cleaned polar substrate surface from the UV/Ozone treatment with a urethane or epoxy adhesive forms an unexpectedly strong adhesive bond. The functional groups also improve the adhesion by improving the wetting of the surface by the adhesion and/or by providing sites for reaction with the adhesive. The UV irradiation may also cause some low molecular weight material at the surface to be bound by crosslinking with the substrate.

In the practice of the present invention, the low intensity short wavelength ultraviolet radiation incident on the surface of the thermoset FRP parts is from about 0.1 to about 10 seconds, preferably from about 0.1 to about 5 seconds.

It is noted that in the practice of the present invention, the thermoset FRP part surface is cleaned as opposed to etched. Etching removes not only contaminants on the surface but also substantial portions of the substrate surface itself as in excess of 200 angstroms and typically in excess of 1,000 angstroms.

The UV/Ozone treatment prior to the adhesive application can be performed at atmospheric pressure or reduced or increased pressure and at room temperature. It is conventional and preferred that it be carried out in air but it can be carried out in a gas containing a greater concentration of oxygen than in air.

The following examples will serve to illustrate the present invention with more particularity to those skilled in the art.

EXAMPLES

An SMC was made as follows:

| Ingredients | % By Weight |
|---|---|
| Poly(propylene fumarate/adipate) | 7.4 |
| Styrene | 10.8 |
| Poly(ethylene/propylene adipate) polyurethane (low shrink additive) | 3.8 |
| Filler (calcium carbonate) | 48 |
| Glass fibers | 28 |
| Peroxides, inhibitors, release agents, maturation agents, pigments | 2 |

The SMC composition was placed in a compression mold in a 240-ton press and cured at about 150° C. for 120 seconds at a pressure of about 1150 psi to make an FRP part.

Flat FRP panels 15.2 cm × 12.7 cm were cut from the cured FRPs. The surfaces of some panels were not treated, others were surface wiped with a PAPI solution, while still others were surface treated with UV/ozone before the surfaces of the panels were coated with an adhesive. Of a given pair of panels to be tested, only the surface of one panel was coated with the adhesive although both surfaces could be coated with the adhesive.

For the UV/Ozone treatment an Oriel 6036 low pressure mercury lamp with an Oriel 6047 power supply was used to provide the short wavelength ultraviolet radiation. According to the Oriel specification, the power supply consumes 14 watts; most of the radiant energy output (90 percent) is at the 254 nm mercury line and is about 1.3 milliwatts/cm² at one inch distance. The lamp was partly covered with aluminum foil which served as a shield and reflector. During treatment at room temperature (ca 25° C.) in air at atmospheric pressure the sample surface was about 2-3 mm away from the lamp. Each increment of sample surface the size of the lamp (approximately 6 × 12 mm) was exposed for the treatment time. The UV/Ozone treatments were done in a hood, and UV absorbing goggles were worn for eye protection.

The adhesive used was a two component polyurethane adhesive. The adhesive base consisted of a prepolymer prepared by reacting a polypropylene ether polyol with excess diphenylmethane diisocyanate. Mineral fillers were added to this base. The curative contained a multifunctional polypropylene ether polyol, a polyurethane catalyst and filler. The components were mixed together and applied to one surface of the plate just before use. The adhesive was applied to the panels from a Kappa dispenser.

Lap shear adhesion tests were used on the FRP panels to evaluate adhesive strength. About 2.5 cm lap joints were made using pairs of 15.2 cm 33 12.7 cm flat panels using aluminum fixtures to hold the pieces in alignment during curing.

The panels were assembled and cured for 30 minutes at 100° C. The assemblies or specimens were stored overnight at room temperature and then heat treated for one hour at 150° C.

After curing and heat treatment, each of the composites were cut into five 2.5 cm wide lap shear test specimens.

All lap shear adhesion tests were conducted at 80° C. using a crosshead speed of 0.127 cm/min. Half of the test specimens were aged in water for 7 days at 54° C., then stored for one day in air at room temperature before adhesion testing.

The results obtained on testing are shown in Tables I and II below.

TABLE I

Effect of Treatment on Adhesive Strength

| Run No. | FRP Surface Treatment Prior to Applying Adhesive | Aging Conditions | Breaking Force (lbs.) |
|---|---|---|---|
| 1 | None | Room temperature | 277 ± 35 |
| 2 | None | Room temperature | 212 ± 24 |
| 3 | None | 54° C. water for 7 days | 126 ± 14 |
| 4 | None | 54° C. water for 7 days | 146 ± 11 |
| 5 | 2% PAPI* wipe | Room temperature | 176 ± 17 |
| 6 | 2% PAPI* wipe | Room temperature | 280 ± 41 |
| 7 | 2% PAPI* wipe | 54° C. water for 7 days | 141 ± 10 |
| 8 | 2% PAPI* wipe | 54° C. water for 7 days | 158 ± 4 |
| 9 | UV/Ozone 10 sec. | Room temperature | 320 ± 38 |
| 10 | UV/Ozone 10 sec. | 54° C. water for 7 days | 167 ± 17 |
| 11 | UV/Ozone 40 sec. | Room Temperature | 167 ± 58 |
| 12 | UV/Ozone 40 sec. | 54° C. water for 7 days | 103 ± 43 |

*PAPI = polymethylene polyphenyl isocyanate, 2 percent in methylene chloride. Upjohn Co.

TABLE II

Effect of Treatment on Adhesive Strength

| Run No. | FRP Surface Treatment Prior to Applying Adhesive | Aging Conditions | Breaking Force (lbs.) |
|---|---|---|---|
| 21 | None | Room temperature | 115 ± 18 |
| 22 | None | Room temperature | 104 ± 35 |
| 23 | None | 54° C. water for 7 days | 47 ± 33 |
| 24 | None | 54° C. water for 7 days | 55 ± 25 |
| 25 | 2% PAPI* wipe | Room temperature | 216 ± 11 |
| 26 | 2% PAPI* wipe | Room temperature | 330 ± 42 |
| 27 | 2% PAPI* wipe | 54° C. water for 7 days | 123 ± 12 |
| 28 | 2% PAPI* wipe | 54° C. water for 7 days | 142 ± 82 |
| 29 | UV/Ozone 2 sec. | Room temperature | 392 ± 18 |
| 30 | UV/Ozone 2 sec. | 54° C. water for 7 days | 229 ± 7 |
| 12 | UV/Ozone 40 sec. | 54° C. water for 7 days | 103 ± 43 |

*PAPI = polymethylene polyphenyl isocyanate, 2 percent in methylene chloride. Upjohn Co.

Discussion

The effectiveness of the UV/Ozone treatment for modification of polymer surfaces was tested by treating the FRP surfaces for different exposure times. The results of one experiment in which UV/Ozone treatment times of 10 seconds and 40 seconds were used are given in Table I.

The results of Run Nos. 1-12 indicate that UV/Ozone treatment for 10 seconds is effective in improving adhesion strength and durability. The adhesive strength and durability of the samples given the UV/Ozone treatment for 10 seconds exceeded that for the samples given the normal treatment with isocyanate in methylene chloride (2 percent PAPI). However, UV/Ozone treatment for 40 seconds results in decreased adhesion strength and durability. Perhaps the longer treatment results in the formation of a weak boundary layer or a layer which is water sensitive.

As part of another series of adhesion tests, Runs Nos. 21-30, some FRP samples were given the UV/Ozone treatment for two seconds (preferred). The subsequent results of adhesion testing are given in Table II. These results show a dramatic increase in adhesion strength and durability with even shorter UV/Ozone treatment times. The results suggest that the 10 second treatment may be about too long.

In the case of polymer surfaces, there is an additional effect which can be beneficial. After the loosely bound organic material is removed by UV/Ozone treatment, some of the crosslinked polymeric material is oxidized. Oxidation can lead to the formation of peroxide, hydroxy, and carboxylic acid groups on the polymer surface. Such groups can react with polyurethane and epoxy adhesives to form covalent bonds with the surface. It is believed that these bonds can provide resistance to loss of adhesive strength during thermal and humid aging conditions.

There is most likely an optimum UV/Ozone exposure for maximum adhesive strength or maximum adhesion durability. This would depend upon the amount of cleaning required and the amount of surface oxidation needed. It would appear likely that there is an upper exposure limit also. If the polymer surface is too highly oxidized, a layer of oxidized material could be formed which is not well crosslinked with the substrate. This layer would act as a weak boundary layer just like that found on many untreated FRP surfaces. The desirable and maximum treatment times will vary depending upon the polymer formulation and adhesive formulation.

Some precautions would be necessary during the use of the UV/Ozone process. The short wavelength of ultraviolet light must be confined by shielding to prevent damage to skin surfaces especially to eyes. The use of goggles which absorb UV light will prevent any eye damage. Experience indicates that high intensity sources of UV light are not necessary. Therefore, only ordinary means of protection are required.

The ozone and perhaps small amounts of carbon monoxide can require ventilation. The amounts of ozone are probably on the order of 50 parts per million or less. Carbon monoxide can conceivably be formed; the probability of formation is not known. In any case, the concentration will certainly be less than that of ozone.

The UV/Ozone treatment requires little energy and is rapid. It can easily be automated and can be combined with other operations such as the application of the adhesives. The area of treatment can be easily localized in cases where this might be desirable. The hazards are readily avoided.

While in accordance with the Patent Statutes, the best mode and preferred embodiment has been set forth, the scope of the invention is not limited thereto, but rather by the scope of the attached claims.

What is claimed is:

1. A process for bonding FRP parts comprising:
   treating at least two thermoset FRP parts for a period of from about 0.1 to about 10 seconds with from about 0.05 to about 10 watts/cm$^2$ ultraviolet radiation of a short wavelength to remove from about 1 to about 200 angstroms of material to provide cleaned substrate surfaces;
   coating at least one of said cleaned substrate surfaces with an epoxy-based adhesive, a polyurethane-based adhesive, or combinations of said epoxy-based adhesive and said polyurethane-based adhesive;
   joining a said adhesive coated cleaned substrate surface and a said cleaned substrate surface of another said FRP part together so that said adhesive is positioned between two cleaned substrate surfaces of said FRP parts; and
   curing and heat treating said adhesive so as to form a bond between said parts.

2. A process according to claim 1, wherein said wavelength of said ultraviolet radiation is from about 170 to about 300 nm, and wherein said radiation is from 0.1 to about 4 watts/cm$^2$.

3. A process according to claim 2, wherein said wavelength of said ultraviolet radiation is from about 180 to about 260 nm.

4. A process according to claim 3, wherein the amount of material removed is from about 1 to about 50 angstroms, and wherein said treating time is from about 0.1 to about 5 seconds.

* * * * *